United States Patent
Bae et al.

(10) Patent No.: US 9,238,751 B2
(45) Date of Patent: Jan. 19, 2016

(54) POLYIMIDE PRECURSOR COMPOSITION, METHOD FOR PREPARING POLYIMIDE, POLYIMIDE PREPARED BY USING THE METHOD, AND FILM INCLUDING THE POLYIMIDE

(71) Applicant: SAMSUNG ELECTRONICS CO., LTD., Suwon-si, Gyeonggi-do (KR)

(72) Inventors: Woo-Jin Bae, Yongin-si (KR); Sung Woo Hong, Seoul (KR); Byung Hee Sohn, Yongin-si (KR); Won Suk Chang, Hwaseong-si (KR)

(73) Assignee: SAMSUNG ELECTRONICS CO., LTD. (KP)

( * ) Notice: Subject to any disclaimer, the term of this patent is extended or adjusted under 35 U.S.C. 154(b) by 39 days.

(21) Appl. No.: 14/202,182

(22) Filed: Mar. 10, 2014

(65) Prior Publication Data

US 2014/0371365 A1  Dec. 18, 2014

(30) Foreign Application Priority Data

Jun. 13, 2013 (KR) .................. 10-2013-0068055

(51) Int. Cl.
C09D 179/08 (2006.01)
C08G 73/10 (2006.01)
C08K 9/04 (2006.01)
C08K 3/36 (2006.01)
C08K 3/22 (2006.01)

(52) U.S. Cl.
CPC .......... C09D 179/08 (2013.01); C08G 73/1039 (2013.01); C08G 73/1042 (2013.01); C08G 73/1067 (2013.01); C08K 9/04 (2013.01); C08K 3/36 (2013.01); C08K 2003/221 (2013.01); C08K 2003/2241 (2013.01); C08K 2003/2244 (2013.01)

(58) Field of Classification Search
CPC ............. C09D 179/08; C08G 73/1042; C08G 73/1067; C08G 73/1039; C08K 9/04
See application file for complete search history.

(56) References Cited

U.S. PATENT DOCUMENTS

2011/0039105 A1* 2/2011 Zimmerman et al. ......... 428/403
2011/0245378 A1* 10/2011 Russ et al. .................... 523/440

OTHER PUBLICATIONS

Woo et al. High refractive index and high transparency HfO2 nanocomposites for next generation lithography. J. Mater. Chem., 2010, 20, 5186-5189.*
Vo et al. Surface modification of hydrophobic nanocrystals using short-chain carboxylic acids. Journal of Colloid and Interface Science 337 (2009) 75-80.*

* cited by examiner

Primary Examiner — John Uselding
(74) Attorney, Agent, or Firm — Cantor Colburn LLP

(57) ABSTRACT

A polyimide precursor composition, including a polyamic acid including a repeating unit represented by Chemical Formula 1 and transparent metal oxide nanoparticles coordinated to a ligand represented by RCOOH, wherein R is a linear or branched C1-C4 alkyl or a linear or branched C2-C4 alkenyl:

Chemical Formula I

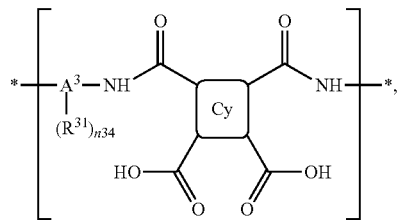

wherein variables Cy, $A^3$, $R^{31}$, and n34 in Chemical Formula I are described in the specification.

20 Claims, 3 Drawing Sheets

FIG. 1B

|  | Transmittance(%) | | | YI | Haze |
|---|---|---|---|---|---|
|  | Total length transmittance | 400nm | 400nm | | |
| Commercial TiO2 nanoparticles | 16.22 | 6.30 | 9.12 | 3.99 | 14.21 |
| TiO2-MAA | 87.63 | 45.26 | 49.61 | 3.53 | 0.76 |
| HFO2-MAA | 87.63 | 88.70 | 90.37 | 1.15 | 0.29 |
| HfO2-AC | 92.64 | 89.46 | 90.93 | 1.13 | 0.78 |
| HfO2-AA | 93.12 | 87.23 | 88.85 | 1.13 | 0.89 |

POLYIMIDE PRECURSOR COMPOSITION, METHOD FOR PREPARING POLYIMIDE, POLYIMIDE PREPARED BY USING THE METHOD, AND FILM INCLUDING THE POLYIMIDE

CROSS-REFERENCE TO RELATED APPLICATION

This application claims priority to Korean Patent Application No. 10-2013-0068055, filed on Jun. 13, 2013, and all the benefits accruing therefrom under 35 U.S.C. §119, the content of which is incorporated herein in its entirety by reference.

BACKGROUND

1. Field

This disclosure relates to a polyimide precursor composition, a method of preparing a polyimide, a polyimide prepared by using the method, and a film including the polyimide.

2. Description of the Related Art

A colorless transparent material has been researched for diverse purposes such as for an optical lens, a functional optical film, and a disk substrate. But as information devices are being further miniaturized and display devices are providing higher resolution, more functions and greater performance are required from the material.

Therefore, there remains a need in development of a colorless transparent material having excellent transparency, heat resistance, mechanical strength, and flexibility.

SUMMARY

An embodiment provides a polyimide precursor composition for a polyimide having improved thermal stability, optical transmittance, and mechanical properties.

Another embodiment provides a method of preparing a polyimide having improved thermal stability, optical transmittance, and mechanical properties.

Yet another embodiment provides a polyimide having improved thermal stability, optical transmittance, and mechanical properties prepared according to the method of preparing the polyimide.

Still another embodiment provides a film including the polyimide.

In an embodiment, a polyimide precursor composition including a polyamic acid including a repeating unit represented by Chemical Formula 1 and transparent metal oxide nanoparticles coordinated to a ligand represented by RCOOH, wherein R is a linear or branched C1-C4 alkyl or a linear or branched C2-C4 alkenyl is provided.

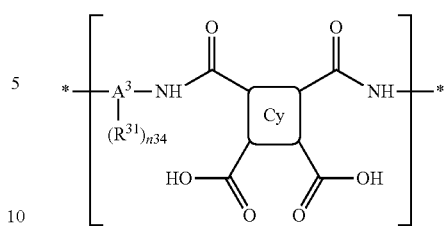

Chemical Formula I

In Chemical Formula 1,

Cy is the same or different in each repeating unit, and is each independently a functional group selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —$SO_2$—, —C(=O)—, and —O—, $A^3$ is a substituted or unsubstituted C1 to C20 alkylene group, a substituted or unsubstituted C5 to C40 arylene group, a substituted or unsubstituted C3 to C40 heteroarylene group, a substituted or unsubstituted C5 to C40 cycloalkylene group, or a substituted or unsubstituted C5 to C40 heterocycloalkylene group, $R^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, n34 is an integer ranging from 0 to 10, provided that n34+2 is equal to the valency of $A^3$.

The transparent metal oxide nanoparticle may be selected from $TiO_2$, $HfO_2$, $ZrO_2$, $SiO_2$, and a combination thereof.

The ligand represented by RCOOH may be acetic acid, acrylic acid, or methacrylic acid.

The transparent metal oxide nanoparticles may be included in an amount of less than or equal to about 0.5 percent by weight based on the total weight of the polyamic acid and the transparent metal oxide nanoparticle.

The polyamic acid including the repeating unit represented by Chemical Formula 1 may be a product of a reaction of an amine compound represented by Chemical Formula 2 and an acid dianhydride represented by Chemical Formula 3.

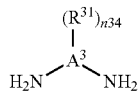

Chemical Formula 2

In Chemical Formula 2, $A^3$, $R^{31}$, and n34 are the same as in Chemical Formula 1.

Chemical Formula 3

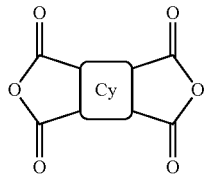

In Chemical Formula 3,

Cy is the same as in Chemical Formula 1.

The amine compound represented by Chemical Formula 2 may be selected from compounds represented by chemical formulae, and a combination thereof.

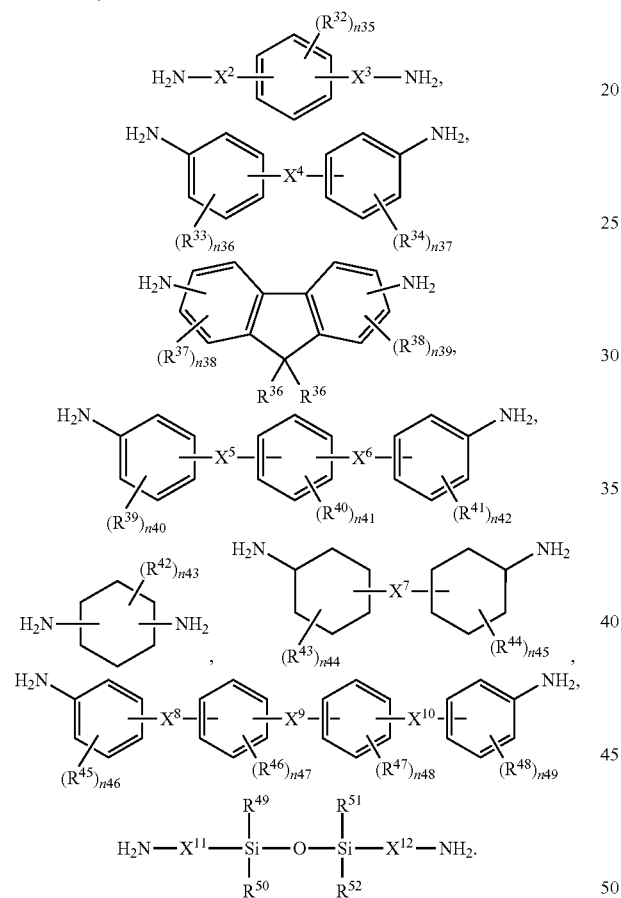

In chemical formulae, $R^{32}$ to $R^{52}$ are the same or different and are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and are each independently a single bond, a substituted or unsubstituted C1 to C10 alkylene group, a substituted or unsubstituted C1 to C10 cycloalkylene group, a substituted or unsubstituted C6 to C15 arylene group, $—SO_2—$, $—O—$, $—C(=O)—$, or a combination thereof, n35 to n37 and n40 to n49 are each independently integers ranging from 0 to 4, and n38 and n39 are each independently integers ranging from 0 to 3.

For example, the amine compound represented by Chemical Formula 2 may be selected from compounds represented by chemical formulae, and a combination thereof.

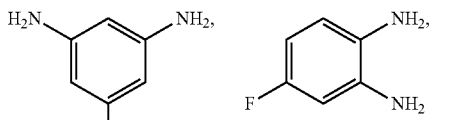

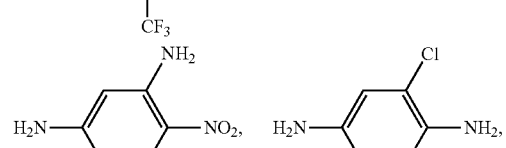

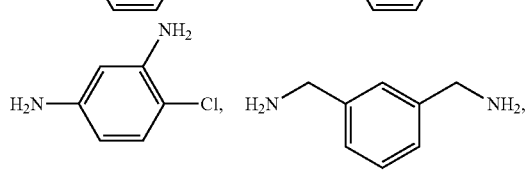

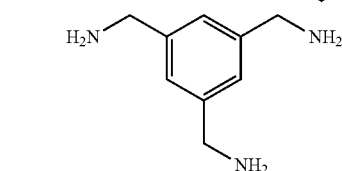

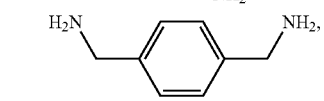

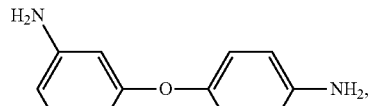

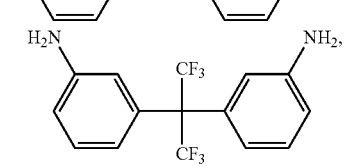

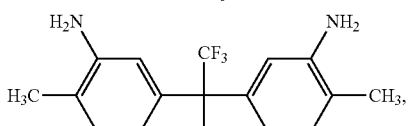

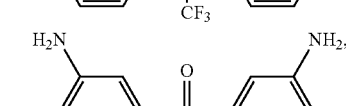

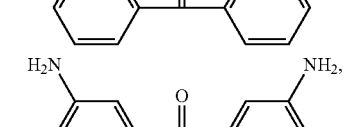

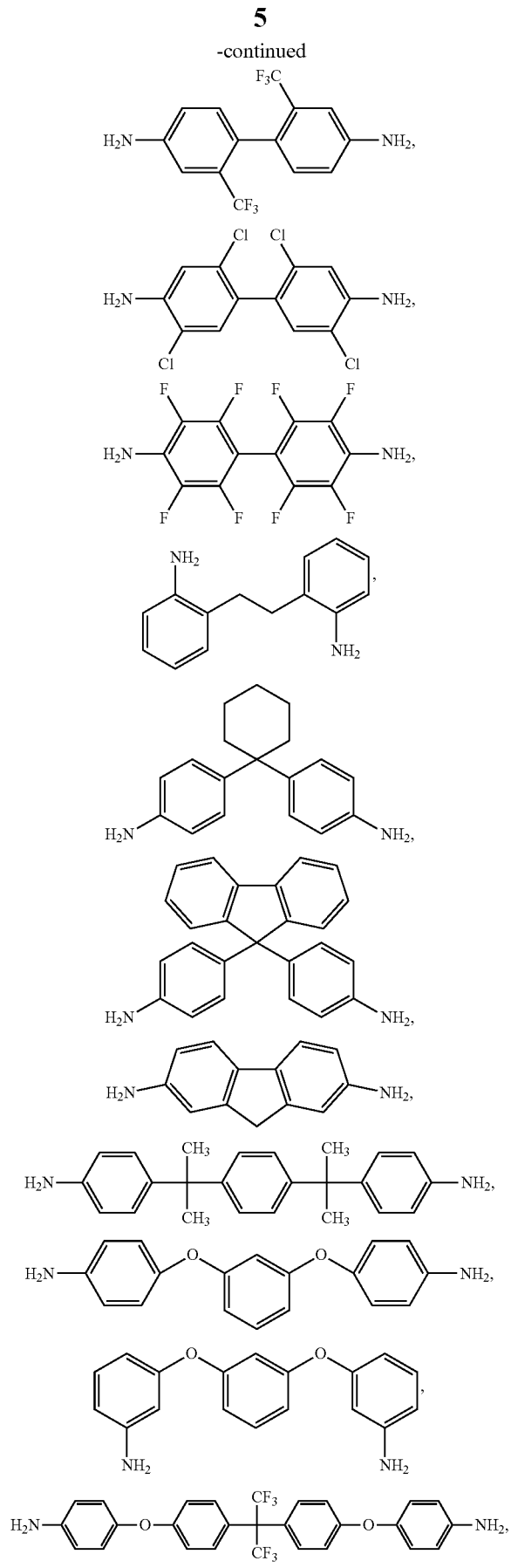

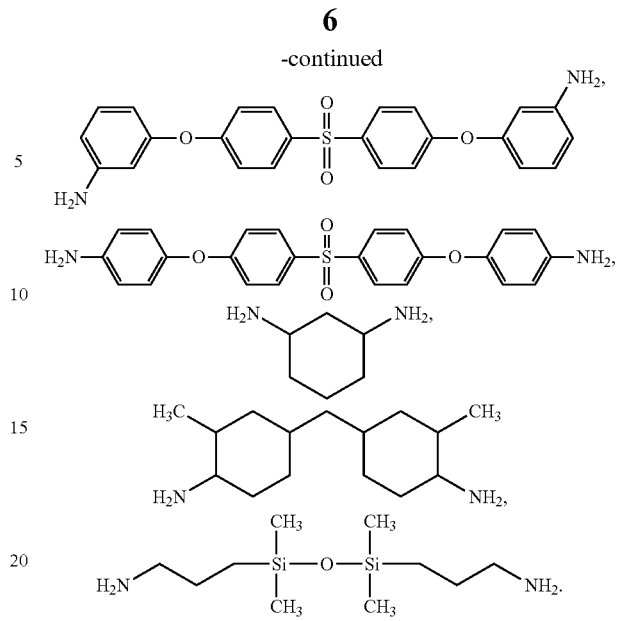

In addition, the acid dianhydride compound represented by Chemical Formula 3 may be at least one selected from 3,3', 4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

In another embodiment, a method of preparing a polyimide including imidizing the polyimide precursor composition according to an embodiment is provided.

The imidizing may include heat-treating the polyimide precursor composition at a temperature of about 200° C. to about 350° C.

In yet another embodiment, a polyimide prepared according to the preparation method is provided.

The polyimide may have improved optical characteristics, thermal properties, and/or mechanical properties due to the transparent metal oxide nanoparticles.

In still another embodiment, a film including the polyimide is provided.

The film may be a transparent polymer substrate.

The film may have about 0.5% or more increased light transmittance compared with a film without the metal oxide nanoparticles.

For example, the film may have light transmittance of greater than or equal to about 85% for light of a visible ray region.

The film may have haze of less than or equal to about 1.2, and yellow index of less than or equal to about 17.

The film may have improved thermal stability, a 0.1 percent by weight (wt %) loss temperature thereof may increase by greater than or equal to about 20° C., and a glass transition temperature may increase by greater than or equal to about 10%.

For example, the film may have a 0.1 wt % loss temperature ranging from about 200° C. to about 450° C.

For example, when the metal oxide nanoparticles are coordinated to acetic acid, the toughness of the film may be about 2 to 4 times greater than the toughness of a polyimide film including no metal oxide nanoparticles.

For example, the film may have a tensile strength at a break point of about 120 megapascals ("MPa") to about 300 MPa, and the film may have break elongation of about 1.0 to about 4.0. The film may have toughness of about 900 kilojoules per cubic meter ("KJ/m$^3$") to about 5,000 KJ/m$^3$.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 1B is a table showing total light transmittance, transmittance at 400 nm and 430 nm, yellow index ("YI"), and haze of each type of nanoparticle containing dispersion of FIG. 1A.

DETAILED DESCRIPTION

Figure 1A:
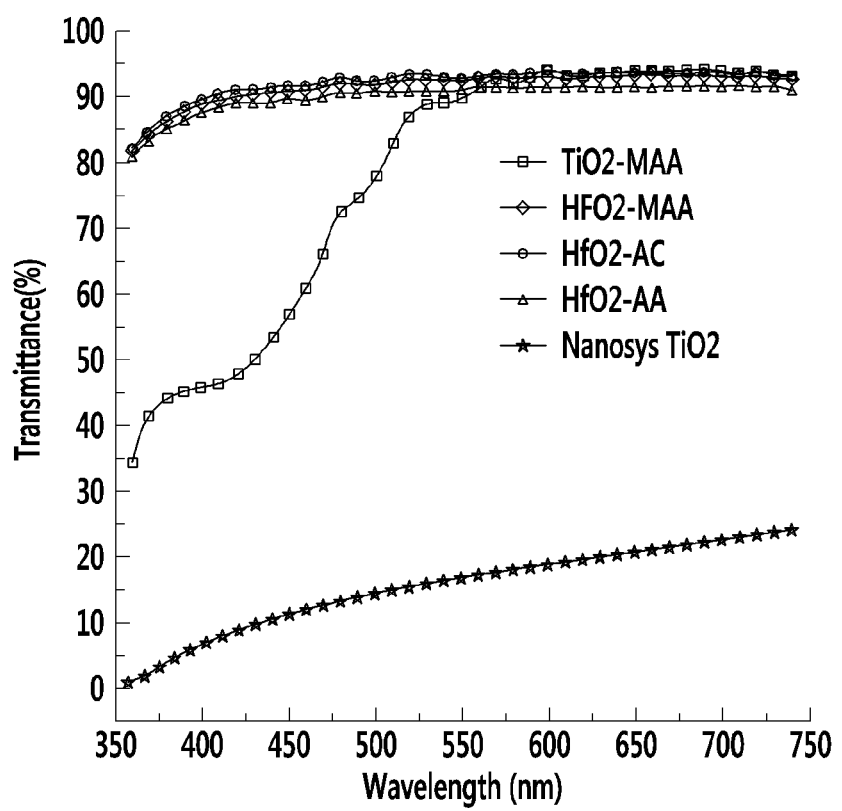
FIG. 1A is a graph of transmittance (percent, %) versus wavelength (nanometers, nm) showing transmittance in a 350 to 750 nm range of TiO$_2$ and HfO$_2$ nanoparticles that are coordinated to each of ligand acrylic acid ("AA"), methacrylic acid ("MAA"), and acetic acid ("AC"), and then dispersed in NMP (1-methyl-2-pyrrolidone) at 1 percent by weight ("wt %") concentrations, compared with NMP dispersion including TiO$_2$ nanoparticles without being coordinated to the ligand at the same concentration.

Hereinafter, embodiments are described in detail. However, these embodiments are exemplary, and this disclosure is not limited thereto but rather is defined by the scope of the appended claims.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Additional aspects will be set forth in part in the description which follows and, in part, will be apparent from the description.

As used herein, when a specific definition is not otherwise provided, the term "carbocyclic group" refers to a group formed by a removal of one or more hydrogen atom from a cycloalkane, cycloalkene, or cycloalkyne and having one or more rings and having the specified number of carbon atoms. The carbocyclic group may have a substituent such as a halogen, a C1 to C20 haloalkyl group, a nitro group, cyano group, a C1 to C20 alkoxy group, and a C1 to C10 lower alkylamino group. Non-limiting examples of the carbocyclic groups may include bicyclo[2.2.2]oct-2-ene-5,6,7,8-tetrayl group and 1,2,3,4-tetrahydronaphthalene-1,2,4-triyl group.

As used herein, when a specific definition is not otherwise provided, the term "monocyclic aromatic group" refers to an aromatic system including one aromatic ring and having the specified number of carbon atoms. The monocyclic aromatic group may have a substituent such as a halogen, a C1 to C20 haloalkyl group, a nitro group, cyano group, a C1 to C20 alkoxy group, and a C1 to C10 lower alkylamino group.

As used herein, when a specific definition is not otherwise provided, the term "condensed polycyclic aromatic group" refers to an aromatic group including two or more aromatic rings and having the specified number of carbon atoms, wherein two or more aromatic rings are condensed (i.e., fused) with one another. At least one of hydrogen atoms among condensed cyclic aromatic groups may be replaced with a substituent such as a halogen, a C1 to C20 haloalkyl group, a nitro group, a cyano group, a C1 to C20 alkoxy group, and a lower C1 to C10 alkylamino group.

As used herein, when a specific definition is not otherwise provided, the term "non-condensed polycyclic aromatic group" refers to an aromatic group including two or more aromatic rings linked to one another by a single bond or by a linker and having the specified number of carbon atoms. The linker may be a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO$_2$—, —C(=O)—, and —O—. The substituted or unsubstituted cycloalkylene group in the linker may include one or more fused aromatic rings. For example, the substituted or unsubstituted cycloalkylene group in the linker may be a substituted or unsubstituted 9-fluorenylydene group. The C6 to C20 non-condensed polycyclic aromatic groups linked to each other by an aromatic group may have a substituent such as a halogen, a C1 to C20 haloalkyl group, a nitro group, a cyano group, a C1 to C20 alkoxy group, and a C1 to C10 lower alkylamino group.

As used herein, when a definition is not otherwise provided, the term "substituted" refers to a group or compound substituted with a substituent selected from a halogen(—F, —Br, —Cl, or —I), a hydroxy group, a C1 to C15 haloalkyl group, a nitro group, a cyano group, a C1 to C15 alkoxy group, an amino group (—NH$_2$, —NH(R$^{100}$) or —N(R$^{101}$)(R$^{102}$), wherein R$^{100}$, R$^{101}$, and R$^{102}$ are the same or different and may independently be a C1 to C10 alkylamino group), an amidino group, a hydrazine group, a hydrazone group, a carboxyl group, an ester group, a ketone group, a substituted or unsubstituted alkyl group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, instead of at least one hydrogen in a functional group, or the substituents may be linked to each other to form a ring.

As used herein, when a definition is not otherwise provided, the term "hetero" refers to a functional group including 1 to 3 heteroatoms selected from N, O, S, P, and Si.

As used herein, when a specific definition is not otherwise provided, the term "alkyl group" refers to a straight or branched chain saturated aliphatic hydrocarbon having the specified number of carbon atoms. Non-limiting examples of the alkyl group are methyl and ethyl.

As used herein, when a definition is not otherwise provided, the term "alkoxy group" refers to an alkyl group that is linked via an oxygen (i.e., alkyl-O—). Non-limiting examples of the alkoxy group are methoxy and ethoxy.

As used herein, when a definition is not otherwise provided, the term "fluoroalkyl group" refers to an alkyl group in which at least one hydrogen is replaced with fluorine. Non-limiting examples of the fluoroalkyl group are fluoromethyl and 2-fluoroethyl.

As used herein, when a definition is not otherwise provided, the term "cycloalkyl group" refers to a group having one or more saturated rings in which all ring members are carbon. Non-limiting examples of the cycloalkyl group are cyclopentyl and cyclohexyl.

As used herein, when a definition is not otherwise provided, the term "heterocycloalkyl group" refers to a saturated cyclic group containing from 1 to about 3 heteroatoms chosen from N, O, and S, with remaining ring atoms being carbon. Non-limiting example of the heterocycloalkyl group is 2-tetrahydropyranyl.

As used herein, when a definition is not otherwise provided, the term "cycloalkoxy group" refers to a cycloalkyl group that is linked via an oxygen (i.e., cycloalkyl-O—). Non-limiting example of the cycloalkoxy group is cyclopentyloxy and cyclohexyloxy.

As used herein, when a definition is not otherwise provided, the term "aryl group" refers to an aromatic group containing only carbon in the aromatic ring or rings. Non-limiting examples of the aryl group are phenyl and naphthyl.

As used herein, when a definition is not otherwise provided, the term "aryloxy group" refers to an aryl group that is linked via an oxygen (i.e., aryl-O—). Non-limiting examples of the aryl group are phenyloxy and naphthyloxy.

As used herein, when a definition is not otherwise provided, the term "heteroaryl group" refers to a stable 5- to 7-membered monocyclic or 7- to 10-membered bicyclic heterocyclic ring which contains at least 1 aromatic ring that contains from 1 to 4, or preferably from 1 to 3, heteroatoms chosen from N, O, and S, with remaining ring atoms being carbon. Non-limiting examples of the heteroaryl group are 2-pyridyl and 2-imidazolyl.

As used herein, when a definition is not otherwise provided, the term "alkylene group" refers to a straight or branched chain, saturated, divalent aliphatic hydrocarbon group. Non-limiting examples of the alkylene group are methylene and ethylene.

As used herein, when a definition is not otherwise provided, the term "cycloalkylene group" refers to a divalent radical formed by the removal of two hydrogen atoms from one or more rings of a cycloalkyl group. Non-limiting examples of the cycloalkylene group are cyclopentylene and cyclohexylene.

As used herein, when a definition is not otherwise provided, the term "arylene group" refers to a divalent group formed by the removal of two hydrogen atoms from one or more rings of an arene, wherein the hydrogen atoms may be removed from the same or different rings. Non-limiting examples of the arylene group are phenylene and naphthylene.

As used herein, when a definition is not otherwise provided, the term "heterocycloalkylene group" refers to a divalent saturated cyclic group containing from 1 to about 3 heteroatoms chosen from N, O, and S, with remaining ring atoms being carbon. Non-limiting example of the heterocycloalkyl group is 2,6-tetrahydropyranylene.

As used herein, when a definition is not otherwise provided, the term "heteroarylene group" refers to a stable divalent 5- to 7-membered monocyclic or 7- to 10-membered bicyclic heterocyclic group which contains at least 1 aromatic ring that contains from 1 to 4, or preferably from 1 to 3, heteroatoms chosen from N, O, and S, with remaining ring atoms being carbon. Non-limiting examples of the heteroaryl group are 2,6-pyridylene and 2,4-imidazoyene.

As used herein, when a definition is not otherwise provided, "combination" commonly refers to mixing or copolymerization. The term "copolymerization" refers to block copolymerization to random copolymerization, and the term "copolymer" refers to a block copolymer to a random copolymer.

In addition, in the specification, the mark "*" refers to where something is connected with the same or different atom or chemical formula.

According to an embodiment, a polyimide precursor composition including a polyamic acid including a repeating unit represented by the following Chemical Formula 1, and a transparent metal oxide nanoparticle coordinated to a ligand represented by RCOOH (wherein R is a linear or branched C1-C4 alkyl or a linear or branched C2-C4 alkenyl), is provided.

Chemical Formula 1

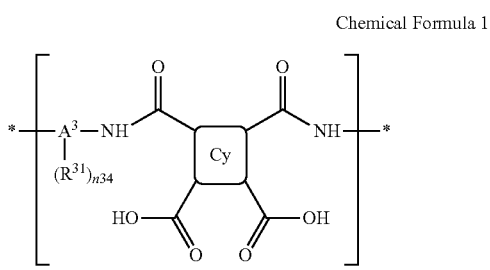

In the above Chemical Formula 1,

Cy is the same or different in each repeating unit, and is each independently a functional group selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —$SO_2$—, —C(=O)—, and —O—, $A^3$ is a substituted or unsubstituted C1 to C20 alkylene group, a substituted or unsubstituted C5 to C40 arylene group, a substituted or unsubstituted C3 to C40 heteroarylene group, a substituted or unsubstituted C5 to C40 cycloalkylene group, or a substituted or unsubstituted C5 to C40 heterocycloalkylene group, $R^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, n34 is an integer ranging from 0 to 10, and provided that n34+2 is equal to the bond valency of $A^3$.

As used herein, a "transparent" metal oxide nanoparticle refers to the transparency of the metal oxide nanoparticle when coordinated to a ligand as described herein. Transparency may be determined upon dispersion in a solvent, for example, as further described below. The metal oxide of the transparent metal oxide nanoparticle may be selected from $TiO_2$, $HfO_2$, $ZrO_2$, $SiO_2$, and combination thereof, for example, $TiO_2$ or $HfO_2$.

The ligand represented by RCOOH may be RCOOH having non-polarity organic solvent solubility, and may be, for example, acetic acid, acrylic acid, or methacrylic acid.

The transparent metal oxide nanoparticles may be included in an amount of less than or equal to about 0.5 percent by weight (wt %), for example less than or equal to about 0.4 (wt %), for another example less than or equal to about 0.3 (wt %), based on the total weight of the polyamic acid and the transparent metal oxide nanoparticles.

The polyimide precursor composition may improve optical characteristics such as transmittance, yellow index ("YI"), haze, and the like, thermal stability, and/or mechanical properties of a polyimide prepared therefrom, by including the transparent metal oxide nanoparticles coordinated to a ligand represented by RCOOH (wherein R is a linear or branched C1-C4 alkyl or a linear or branched C2-C4 alkenyl) within the above range, as well as the polyamic acid including the repeating unit represented by the above Chemical Formula 1.

The polyimide has been used for a material of a substrate for a display and the like due to transparency and thermal stability. However, the polyimide still requires higher transmittance, improved thermal stability, mechanical properties (high Tg, high toughness, etc.), and the like to be used as a better substrate material for a display. A transparent polyimide has high brittleness depending on molecular characteristics of a polymer and it may be difficult to form a film therewith. In order to overcome brittleness of the polyimide film and improve its mechanical properties, use of various additives such as a plasticizer and the like is suggested, but the additives may be included in an amount of greater than or equal to about 3 wt %. However, the additive itself has insufficient thermal stability and thus is decomposed at a high temperature and may deteriorate optical characteristics and properties.

Recently, various organic/inorganic hybrid nanocomposites have been developed to obtain each merit through synergic effects of an organic material and an inorganic material. However, when the inorganic material is added at greater than or equal to about 5 wt %, desired synergic effects may be achieved. In addition, the inorganic material may be surface-treated on the particles, or an organic ligand may be used, so that a large amount of the inorganic material may have miscibility with the organic material. However, the surface-treating agent mostly has no stability at a high temperature and thus deteriorates entire thermal properties and decreases transmittance, even though the stability at a high temperature is important to a transparent substrate.

The polyimide precursor composition according to an embodiment includes transparent metal oxide nanoparticles in a small amount, for example less than or equal to about 0.5 wt %, less than or equal to about 0.4 wt %, less than or equal to about 0.3 wt %, or less than or equal to about 0.2 wt %, based on the total weight of the polyamic acid and transparent metal oxide nanoparticles, and the transparent metal oxide nanoparticles have a structure coordinated to a predetermined organic material ligand so that they may be dispersed in a polar aprotic solvent used for preparation of a polyamic acid or a polyimide. Thereby, polyimide prepared from the polyimide precursor composition may provide a polyimide having improved thermal stability and/or mechanical properties without deterioration of optical characteristics caused by a large amount of inorganic material.

In connection with this, metal oxide nanoparticles such as $TiO_2$ and $HfO_2$ are respectively coordinated to an organic material that is soluble in a polar aprotic solvent used for preparation of a polyimide, for example, acrylic acid ("AA"), methacrylic acid ("MAA"), or acetic acid ("AC"), and then the $TiO_2$ and $HfO_2$ nanoparticles coordinated to the ligands are dispersed in a non-polar organic solvent, NMP, at 1 wt % concentrations. Transmittance in a 350 to 750 nm range of the resultant dispersion was compared with that of an NMP dispersion including $TiO_2$ nanoparticles without being coordinated to the ligand at the same concentration. As a result, as shown in FIG. 1A, when $TiO_2$ or $HfO_2$ nanoparticles are coordinated to the ligand and then dispersed in a non-polar aprotic solvent NMP, transmittance of the $TiO_2$ or $HfO_2$ nanoparticles is sharply increased compared with nanoparticles not coordinated to the ligand over the whole wavelength range. For example, light transmittance in a range of 400 nm may be improved by at least about 6.3 times but at most about 14 times. FIG. 1B is a table showing total light transmittance, transmittance at 400 nm and 430 nm, a yellow index ("YI"), and haze of each sample. Referring to FIG. 1B, a yellow index and haze of a polar aprotic solvent including the metal oxide nanoparticles coordinated to the ligand are dramatically reduced compared with a solvent including commercial $TiO_2$ nanoparticles not coordinated to the ligand.

Figure 2:
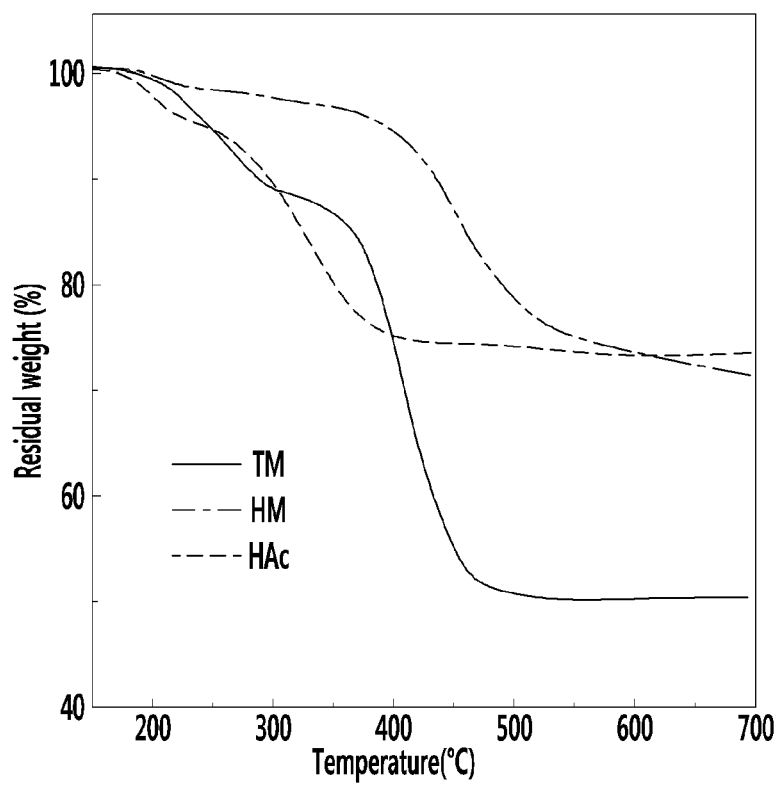
FIG. 2 is a thermogravimetric analysis graph of residual weight of HAc (HfO$_2$-acetate), HM (HfO$_2$-methacrylate), and TM (TiO$_2$-methacrylate) (percent, %) versus temperature (degrees Centigrade, ° C.) including each of TiO$_2$ and HfO$_2$ nanoparticles coordinated to methacrylic acid ("MAA") or acetic acid ("AC").

FIG. 2 is a thermogravimetric analysis graph of $TiO_2$ ("T") or $HfO_2$ ("H") nanoparticles coordinated to acetic acid ("Ac") or methacrylic acid ("M"). As shown in FIG. 2, when the $TiO_2$ or $HfO_2$ nanoparticles are coordinated to acetic acid or methacrylic acid, the ligand is highly resistant to decomposition within a very high temperature range, for example, a temperature of about 200° C., and particularly, when $HfO_2$ ("HM") is coordinated to methacrylic acid, the $HfO_2$ ("HM") maintains greater than or equal to about 90% of its original weight at about 500° C. and shows high stability at a high temperature. The $TiO_2$ ("TM") coordinated to methacrylic acid and the $HfO_2$ ("HAc") coordinated to acetic acid maintain greater than or equal to about 90% of their original weight at a high temperature, for example about 300° C. In other words, the nanoparticles coordinated to acetic acid or methacrylic acid have very high stability at a high temperature compared with the nanoparticles coordinated to other organic materials. Based on the results, nanoparticles coordinated to a ligand are prepared by changing the type of the organic ligand and are dispersed in various non-polar aprotic solvents, and then dispersion degrees of the nanoparticles are measured. As a result, when the nanoparticles are coordinated to a carboxylic acid-based small molecular ligand having a C1 to C4 linear or branched alkyl or alkenyl group such as acetic acid, acrylic acid, and methacrylic acid, the metal oxide nanoparticles show excellent dispersity in a polar aprotic solvent, while metal oxide nanoparticles coordinated to an organic ligand having a number of carbon atoms greater than or equal to 5 show sharply deteriorated dispersity in the polar aprotic solvent.

From the results, when the metal oxide nanoparticles coordinated to a carboxylic acid-based small molecular ligand having a C1 to C4 linear or branched alkyl group or alkenyl group are dispersed in a polar aprotic solvent used to prepare a polyimide, and then the dispersed solution is added in a small amount to the polyamic acid, the precursor of the polyimide, optical characteristics, thermal stability, and/or mechanical properties of the polyimide sharply increase. In other words, a composition prepared by adding the transparent metal oxide nanoparticles coordinated to a small molecular organic material having excellent dispersity in a polar aprotic solvent used to prepare a polyimide from a polyamic acid, a polyimide precursor, may bring about synergic effects due to a hybrid of organic/inorganic moieties.

On the other hand, as shown from examples, when a composition according to an embodiment includes metal nanoparticles in an amount of less than or equal to about 0.5 wt %, for example, less than or equal to about 0.4 wt %, or less than or equal to about 0.2 wt %, the composition shows remarkably improved optical characteristics, thermal stability, and/or mechanical properties, which cannot be achieved by a conventional additive or an inorganic particle composite.

In addition, when acetic acid among the organic ligands is particularly used as a ligand, a polyimide formed from a polyimide precursor composition including this acetic acid ligand shows much further increased thermal properties and mechanical properties. Without being bound to a specific theory, it is believed that the acetic acid ligand is exchanged with carboxylic acid in a main chain of a polyamic acid polymer, and accordingly, the metal nanoparticles coordinated to acetic acid are cross-linked among the polyamic acid polymer main chains, and that the glass transition temperature ("Tg") and mechanical properties (toughness) of a polyimide film formed of the polyimide precursor are much increased (refer to Examples 1 to 4 and Table 1).

On the other hand, metal oxide nanoparticles coordinated to an organic material including a double bond such as acrylic acid or methacrylic acid may carry out polymerization among the ligand when heated to prepare a polyimide, and accordingly, the metal oxide nanoparticles coordinated to the ligand do not participate in a cross-linking bond among polyamic acid polymers. Accordingly, when metal oxide nanoparticles coordinated to the ligands including double bond are used, optical characteristics and thermal properties of the polyimide film prepared the composite including the metal oxide nanoparticles are remarkably improved, even though mechanical properties of the polyimide film are not much increased (refer to Examples 8 to 15 and Tables 3 and 4).

According to an embodiment, when metal oxide nanoparticles coordinated to the ligand are added in a small amount, a polyimide precursor composition sharply improving thermal stability and/or mechanical properties as well as maintaining or improving optical characteristics of a polyimide is provided.

The polyamic acid including the repeating unit represented by the above Chemical Formula 1 may be prepared by reacting an amine compound represented by the following Chemical Formula 2 with an acid dianhydride represented by the following Chemical Formula 3.

Chemical Formula 2

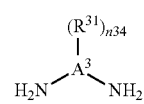

In the above Chemical Formula 2,
$A^3$, $R^{31}$, and n34 are the same as described in the above Chemical Formula 1.

Chemical Formula 3

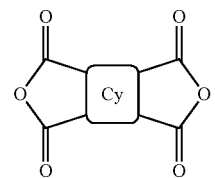

In the above Chemical Formula 3,
Cy is the same as described in the above Chemical Formula 1.

The functional group represented by the following Chemical Formula 4 of the repeating unit represented by the above Chemical Formula 1 may be derived from the amine compound derived from the above Chemical Formula 2.

Chemical Formula 4

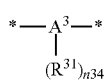

In the above Chemical Formula 4,
$A^3$, $R^{31}$, and n34 are the same as described in the above Chemical Formula 1.

The amine compound represented by the above Chemical Formula 2 may be selected from the compounds represented by the following chemical formulae, and a combination thereof.

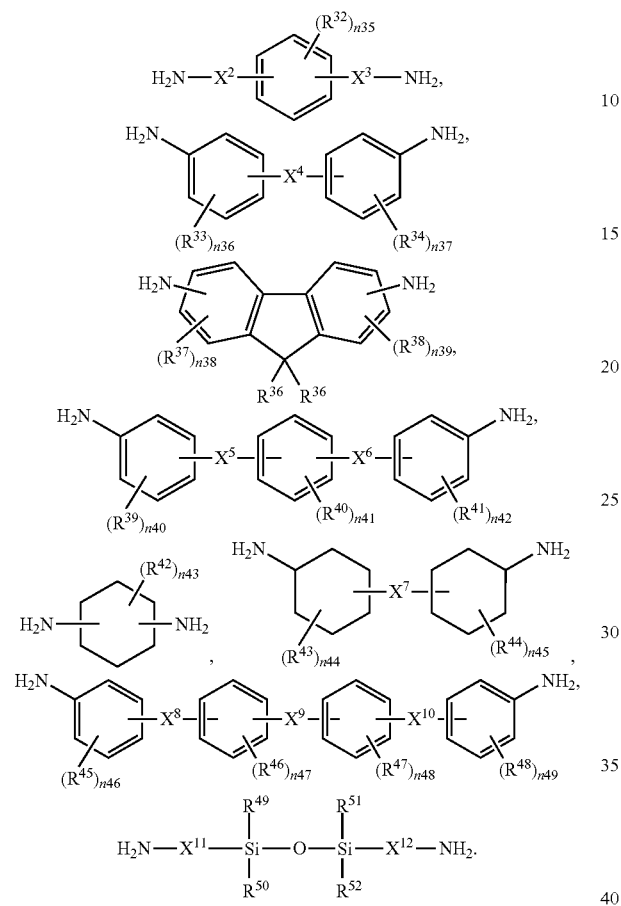

In the above chemical formulae, $R^{32}$ to $R^{52}$ are the same or different and are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and are each independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37 and n40 to n49 are integers ranging from 0 to 4, and n38 and n39 are integers ranging from 0 to 3.

More specifically, the amine compound represented by the above Chemical Formula 2 may be selected from the compounds represented by the following chemical formulae, and a combination thereof, but is not limited thereto.

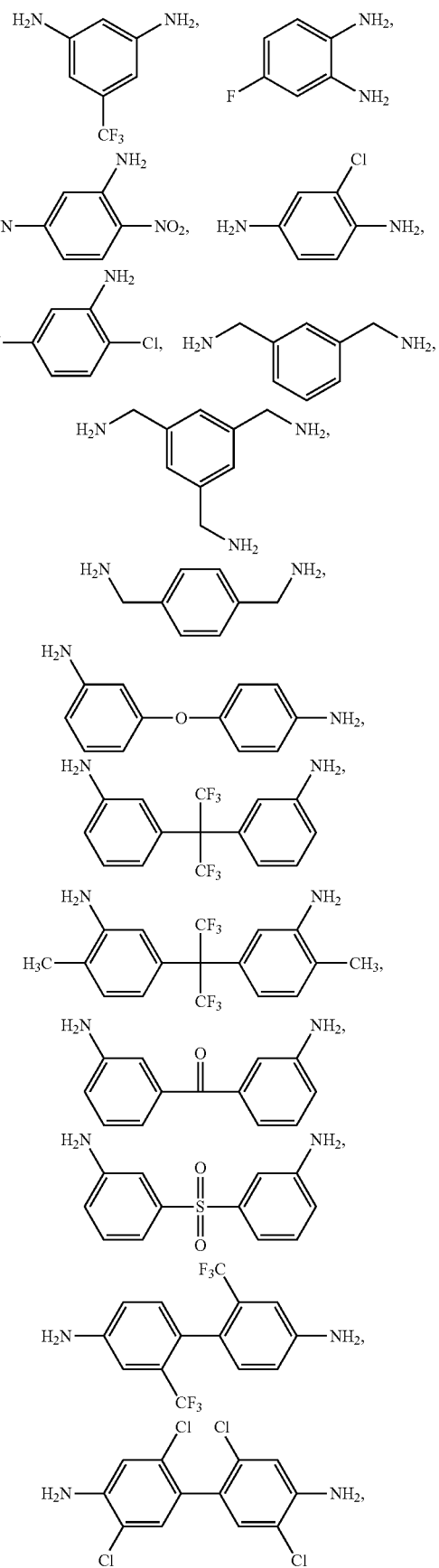

-continued

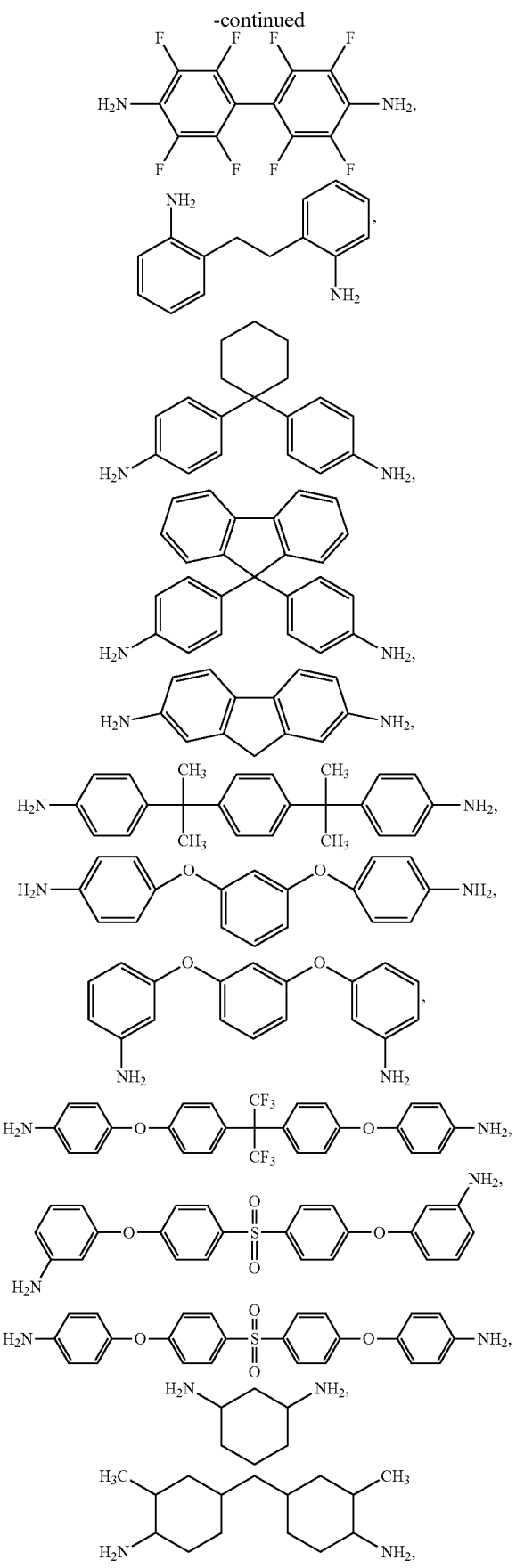

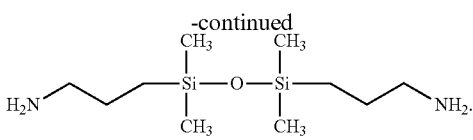

The acid dianhydride compound represented by the above Chemical Formula 3 may be at least one selected from 3,3', 4,4'-biphenyl tetracarboxylic dianhydride ("BPDA"), bicyclo [2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), and 4-(2,5-dioxotetrahydrofuran-3-yl)-1,2,3,4-tetrahydronaphthalene-1,2-dicarboxylic anhydride ("DTDA"), but is not limited thereto, and these may be used singularly or in a mixture of two or more.

The amine compound represented by the above Chemical Formula 2 easily reacts with the acid dianhydride compound represented by the above Chemical Formula 3 without a catalyst to form the polyamic acid, and therefore transparency of a polyimide substrate prepared therefrom may be improved.

The organic solvent used for preparation of the polyamic acid may be N-methylpyrrolidone ("NMP"), N,N-dimethylformamide ("DMF"), N,N-diethylformamide, N,N-dimethylacetamide ("DMAC"), N-methylcaprolactam, N-methyl propionamide, dimethylsulfoxide, pyridine, tetrahydrofuran, diethyl ether, ethylene glycol dimethyl ether, cyclohexanone, 1,4-dioxane, or other polar aprotic solvents, but is not limited thereto. The organic solvents may be used singularly or in a mixture of two or more.

The polyimide precursor composition may further include an organic solvent in order to improve coating properties. Specific examples of the organic solvent may be selected from dimethylsulfoxide; N-methylpyrrolidone ("NMP"); N,N-dimethylformamide ("DMF"); N,N-dimethylacetamide ("DMAC"); N-methylformamide ("NMF"); alcohols selected from methanol, ethanol, 2-propanol, 2-methyl-1-butanol, and 2-methyl-2-butanol; ketones selected from γ-butyrolactone, cyclohexanone, 3-hexanone, 3-heptanone, 3-octanone, acetone, and methyl ethyl ketone; tetrahydrofuran; diethyl ether, ethylene glycol dimethyl ether, 1,4-dioxane, dichloromethane, trichloroethane; and a combination thereof, but are not limited thereto. These solvents may be used singularly or in a mixture of two or more.

In another embodiment, a method of preparing a polyimide including imidizing the polyimide precursor composition according to an embodiment is provided.

In the method of preparing the polyimide, the imidizing may include heat-treating the polyimide precursor composition at a temperature of about 200° C. to about 350° C. When the imidizing is performed within the above temperature range, a film including a polyimide prepared therefrom may effectively maintain excellent transmittance and flexibility. For example, the imidizing may be performed by heat-treating at a temperature of about 250° C. to about 300° C.

In yet another embodiment, a polyimide prepared according to the preparation method is provided.

According to an embodiment, the polyimide includes a small amount of transparent metal oxide nanoparticles dispersed among polyimide polymer chains, and thus shows excellent optical characteristics and simultaneously excellent thermal stability and sharply improved mechanical properties.

In still another embodiment, a film including the polyimide is provided.

The film may be a substrate for a device, an optical film, an IC (integrated circuit) package, an adhesive film, a multi-layered FPC (flexible printed circuit), a tape, and the like. For example, the film may be used as a transparent polymer substrate.

The film may have an increase in light transmittance about 0.5% or more compared with a film without including the metal oxide nanoparticles. For example, the film may have light transmittance of greater than or equal to about 85% for light of a visible ray region, for example about 400 nm to about 750 nm.

The film may have a yellow index ("YI") of less than or equal to about 17, and haze of less than or equal to about 1.2.

When the film has optical characteristics within the ranges, the film may be effectively used as a transparent polymer substrate.

In addition, the film shows increased thermal stability compared with a film formed of a polyimide including no metal oxide nanoparticles. For example, a 0.1 wt % loss temperature of the film may increase by greater than or equal to about 20° C., and in addition, the glass transition temperature ("Tg") of the film may increase by greater than or equal to about 10%.

In an embodiment, the film may have a 0.1 wt % loss temperature ranging from about 200° C. to about 450° C.

For example, when the metal oxide nanoparticles are coordinated to acetic acid, the film may have about twice to four times increased mechanical properties, such as toughness, compared to the film having no metal oxide nanoparticles.

For example, the film may have tensile strength at a break point of about 120 megapascals ("MPa") to about 300 MPa, and the film may have break elongation of about 1.0 to about 4.0. The film may have toughness of about 900 kilojoules per cubic meter ("KJ/m$^3$") to about 5,000 KJ/m$^3$.

When transmittance and thermal stability are within the foregoing ranges, thermal characteristics of a substrate including the film may be improved.

Hereafter, this disclosure is described in detail with reference to examples. The following examples and comparative examples are not restrictive but are illustrative.

EXAMPLES

Examples 1 to 4

Preparation of Polyimide Film

PMDA (pyromellitic dianhydride) and TFDB (2,2'-bis(trifluoromethyl)benzidine) in a mole ratio of 1:1 are put in a 500 mL double jacket flask, and NMP as a solvent is used to adjust the amount of a monomolecule (a solute) to 18 wt %. The mixture is reacted at room temperature of 20° C. for 48 hours, preparing a polyamic acid solution.

On the other hand, HfO$_2$-acetate nanoparticles are dispersed in NMP (1-methyl-2-pyrrolidone), and the dispersed resultant is mixed with the polyamic acid solution, preparing mixed solutions respectively including 0.02, 0.04, 0.1, and 0.2 wt % of the HfO$_2$-acetate nanoparticles (Examples 1 to 4, sequentially).

The mixed solutions are dispersed using vortex and ultrasonic wave cleaners, and mixed at 100 rounds per minute ("rpm") for 24 hours with a rotary mixer, preparing a polyamic acid-metal oxide nanoparticle composite solution. Then, each composite solution is spin-coated on a glass substrate, dried on an 80° C. hot plate for 1 hour to remove the solvent therein, and then heated up to 300° C. at 3 degrees Centigrade per minute ("° C./min") in a furnace and maintained for one hour for imidization, preparing each polyimide film.

Examples 5 to 7

Preparation of Polyimide Film

PMDA (pyromellitic dianhydride), 6FDA (4,4'-(hexafluoroisopropylidene) diphthalic anhydride), BPDA (3,3',4,4'-biphenyltetracarboxylic acid dianhydride), and TFDB (2,2'-bis(trifluoromethyl)benzidine) in a mole ratio of 65:15:20:100 are put in a 500 mL double jacket flask, and NMP as a solvent is used to adjust the amount of monomolecules (a solute) to 18 wt %. The mixture is reacted at room temperature of 20° C. for 24 hours, preparing a polyamic acid solution.

On the other hand, HfO$_2$-acetate nanoparticles are dispersed in NMP (1-methyl-2-pyrrolidone), and this dispersed resultant is mixed with the polyamic acid solution, preparing each mixed solution including the HfO$_2$-acetate nanoparticles in each concentration of 0.4, 1.0, and 2.0 wt % (Example 5 to 7, sequentially).

The mixed solutions are respectively dispersed using vortex and ultrasonic wave cleaners and mixed with a rotary mixer at 100 rpm for 24 hours, preparing a polyamic acid-metal nanoparticle composite solution. Then, each composite solution is spin-coated on a glass substrate, dried on a 80° C. hot plate for 1 hour to remove the solvent, and heated in a furnace at a rate of 3° C./min up to 300° C. and maintained for 1 hour for imidization, forming each polyimide film.

Examples 8 to 15

Preparation of Polyimide Film

PMDA (pyromellitic dianhydride) and TFDB (2,2'-bis(trifluoromethyl)benzidine) in a mole ratio of 1:1 are put in a 500 mL double jacket flask, and NMP as a solvent is used to adjust the amount of monomolecules (a solute) to 18 wt %. The resultants are reacted at room temperature of 20° C. for 48 hours, preparing each polyamic acid solution.

On the other hand, HfO$_2$-methacrylic acid ("HfO$_2$-MAA") nanoparticles are dispersed in NMP (1-methyl-2-pyrrolidone), and the dispersed resultant is mixed with the polyamic acid solution, preparing each mixed solution including the HfO$_2$-methacrylic acid ("HfO$_2$-MAA") nanoparticles in each concentration of 0.02, 0.04, 0.1, and 0.2 wt % (Examples 8 to 11, sequentially).

In addition, TiO$_2$-methacrylic acid ("TiO$_2$-MAA") nanoparticles are dispersed in NMP (1-methyl-2-pyrrolidone), and the dispersed resultant is mixed with the polyamic acid solution, preparing each mixed solution including the TiO$_2$-methacrylic acid ("TiO$_2$-MAA") nanoparticles in each concentration of 0.02, 0.04, 0.1, and 0.2 wt % (Examples 12 to 15, sequentially).

The mixed solutions are respectively dispersed by using vortex and ultrasonic wave cleaners in a rotary mixer at 100 rpm for 24 hours, preparing each polyamic acid-metal nanoparticle composite solution. Then, each composite solution is spin-coated on a glass substrate, dried on a 80° C. hot plate for 1 hour to remove a solvent, heated in a furnace at a rate of 3° C./min up to 300° C., and maintained for 1 hour for imidization, manufacturing each polyimide film.

Experimental Example 1

Characteristics Evaluation of Polyimide Films According to Examples 1 to 4

The glass transition temperature ("Tg") of the polyimide films manufactured by adding 0.02 wt % to 0.2 wt % of HfO$_2$-acetate nanoparticles according to Examples 1 to 4 is determined by using differential scanning calorimetry ("DSC") (DSC 2010, TA instruments), and the 0.1 wt % loss temperature ($T_d$ 0.1%) thereof is measured by using a thermogravimetric analyzer TGA Q5000 (TA instruments) (heating rate: 10° C./min). In addition, light transmittance of the polyimide films regarding light ranging from about 400 nm to about 750 nm was measured by using a KONICA MINOLTA Spectrophotometer, and then their total transmittance, haze, and yellow index ("YI") are measured. The loss temperature ($T_d$ 0.1%) indicates a temperature at which 0.1 wt % of each polyimide film is decomposed. In addition, the tensile strength at a break point and toughness of the films were measured by using Instron.

Herein, a polyimide film including the same polyimide as in Examples 1 to 4, but not including HfO$_2$-acetate nanoparticles is used as a control. The measurements are provided in the following Table 1.

TABLE 1

|  | Total transmittance | Haze | Yellow index (YI) | Glass transition temperature (Tg ° C.) | 0.1 wt % loss temperature (° C.) | Tensile strength at a break point (MPa) | Break elongation (%) | Toughness (KJ/m$^3$) |
|---|---|---|---|---|---|---|---|---|
| Control | 86 | 1.5 | 18 | 322 | 183 | 117 | 1.3 | 915 |
| Exa. 1 | 86 | 0.8 | 12 | 346 | 241 | 156 | 2.2 | 2843 |
| Exa. 2 | 87 | 0.9 | 15 | 340 | 222 | 155 | 2.2 | 2870 |
| Exa. 3 | 87 | 1.2 | 16 | 352 | 230 | 213 | 3.1 | 4049 |
| Exa. 4 | 86 | 0.9 | 12 | 326 | 227 | 120 | 1.3 | 1232 |

As shown in Table 1, the polyimide films manufactured by adding 0.02 wt % to 0.2 wt % of HfO$_2$-acetate nanoparticles show increased total transmittance and sharply reduced haze and yellow index, increased glass transition temperature ("Tg"), and greater than and equal to 20% increased 0.1 wt % loss temperature compared with the polyimide film including no HfO$_2$-acetate nanoparticles. In addition, the polyimide films according to Examples 1 to 4 show sharply increased tensile strength at a break point and at least about 1.3 times and at most about 4 times increased mechanical properties.

Experimental Example 2

Characteristics Evaluation of Polyimide Film According to Example 5

The glass transition temperature ("Tg") of the polyimide film manufactured by adding 0.4 wt % of HfO$_2$-acetate nanoparticles according to Example 5 is measured by using a differential scanning calorimetry ("DSC") (DSC 2010, TA instruments), and the 0.1 wt % loss temperature ("$T_{d\,0.1\%}$") of the polyimide film is measured by using a thermogravimetric analyzer (TGA Q5000, TA instruments) (a heating rate: 10° C./min). In addition, the light transmittance of the polyimide film about light ranging from 400 nm to 750 nm is measured by using a KONICA MINOLTA Spectrophotometer, and then, the total transmittance, haze, and yellow index ("YI") of the polyimide film are measured. The loss temperature ("$T_{d\,0.1\%}$") of the polyimide film indicates a temperature at which 0.1 wt % of the polyimide film is decomposed. In addition, the tensile strength at a break point and toughness of the polyimide film are measured by using Instron.

Herein, polyimide film formed of the same polyimide as that of Example 5 but not including the HfO$_2$-acetate nanoparticles is used as a control. The measurements are provided in the following Table 2.

TABLE 2

|  | Total transmittance | Haze | Yellow index (YI) | Glass transition temperature (Tg ° C.) | 0.1 wt % loss temperature (° C.) | Tensile strength at a break point (MPa) | Break elongation (%) | Toughness (KJ/m³) |
| --- | --- | --- | --- | --- | --- | --- | --- | --- |
| Control | 85 | 2.7 | 19 | 351 | 313 | 143 | 1.6 | 1780 |
| Exam. 5 | 85 | 1.7 | 16 | 367 | 336 | 153 | 1.7 | 1991 |

As shown in Table 2, the polyimide film including 0.4 wt % of HfO$_2$-acetate nanoparticles according to Example 5 shows sharply reduced haze and yellow index compared with the polyimide film including no HfO$_2$-acetate nanoparticle and also, increased glass transition temperature ("Tg") and 0.1 wt % loss temperature. In addition, the polyimide film shows increased tensile strength at a break point and mechanical properties.

Experimental Example 3

Characteristics Evaluation of Polyimide Films According to Examples 8 to 15

The glass transition temperatures ("Tg") of the polyimide films respectively including 0.02 wt % to 0.1 wt % of TiO$_2$-MAA nanoparticles according to Examples 8 to 10 and the polyimide films respectively including 0.02 wt % to 0.2 wt % of HfO$_2$-MAA nanoparticles according to Examples 12 to 15 are measured by using a differential scanning calorimetry ("DSC") (DSC 2010, TA instruments), and 0.1 wt % loss temperatures ("T$_{d\ 0.1\%}$") thereof are measured by using a thermogravimetric analyzer (TGA Q5000, TA instruments) (a heating rate: 10° C./min). In addition, light transmittance ranging from 400 nm to 750 nm of the polyimide films are respectively measured by using a KONICA MINOLTA Spectrophotometer, and then, total transmittance, haze, and yellow index ("YI") thereof are measured. The loss temperature ("T$_{d\ 0.1\%}$") indicates a temperature at which 0.1 wt % of the polyimide film is decomposed. In addition, tensile strength at a break point and toughness of polyimide films are measured using Instron.

Herein, polyimide film formed of the same polyimide as the polyimide films according to Examples 8 to 10 but including no TiO$_2$-MAA nanoparticles used in Examples 8 to 10 is used as a control, and polyimide film formed of the same polyimide as the polyimide films according to Examples 12 to 15 but including no HfO$_2$-MAA nanoparticles used in Examples 12 to 15 is used as another control, and the measurements of the films are provided in the following Tables 3 and 4, respectively.

TABLE 3

|  | Total transmittance | Haze | Yellow index (YI) | Glass transition temperature (Tg ° C.) | 0.1 wt % loss temperature (° C.) | Tensile strength at a break point (MPa) | Break elongation (%) | Toughness (KJ/m³) |
| --- | --- | --- | --- | --- | --- | --- | --- | --- |
| Control | 85 | 1.5 | 18 | 322 | 183 | 117 | 1.3 | 915 |
| Exam. 8 | 87 | 0.6 | 14 | 320 | 263 | 120 | 1.2 | 942 |
| Exam. 9 | 86 | 0.7 | 15 | 315 | 235 | 115 | 1.4 | 897 |
| Exam. 10 | 87 | 0.5 | 13 | 326 | 221 | 123 | 1.5 | 916 |

As shown in Table 3, the polyimide films including 0.02 wt % to 0.1 wt % of TiO$_2$-MAA nanoparticles show increased total transmittance and sharply reduced haze and yellow index compared with the polyimide films including no TiO$_2$-MAA nanoparticles. In addition, the polyimide films show no appreciable increase in glass transition temperature ("Tg") but a greater than or equal to about 20% increase in the 0.1 wt % loss temperature. On the other hand, the polyimide films show no appreciable tensile strength difference at a break point and no appreciable mechanical property difference.

TABLE 4

|  | Total transmittance | Haze | Yellow index (YI) | Glass transition temperature (Tg ° C.) | 0.1 wt % loss temperature (° C.) | Tensile strength at a break point (MPa) | Break elongation (%) | Toughness (KJ/m³) |
| --- | --- | --- | --- | --- | --- | --- | --- | --- |
| Control | 85 | 1.5 | 18 | 322 | 183 | 117 | 1.3 | 915 |
| Example 12 | 86 | 1.2 | 15 | 327 | 231 | 133 | 1.5 | 1022 |
| Example 13 | 86 | 2.0 | 12 | 323 | 251 | 102 | 1.1 | 876 |
| Example 14 | 86 | 0.5 | 15 | 324 | 234 | 98 | 1.0 | 855 |
| Example 15 | 85 | 0.9 | 17 | 314 | 235 | 125 | 1.2 | 937 |

As shown in Table 4, the polyimide films including 0.02 wt % to 0.2 wt % of HfO$_2$-MAA nanoparticles show that total transmittance is increased or maintained and haze and yellow index are sharply reduced compared with the control polyimide film including no HfO$_2$-MAA nanoparticles. In addition, the polyimide films show no appreciable glass transition temperature ("Tg") change but a greater than or equal to about 20% increase in the 0.1 wt % loss temperature. On the other hand, the polyimide films show no appreciable tensile strength change at a break point and not much mechanical property change.

As aforementioned, when a polyimide film is manufactured by imidizing a polyimide precursor composition prepared by adding metal oxide nanoparticles coordinated by a small molecular organic material ligand to a polyamic acid according to an embodiment, optical characteristics of the polyimide film are maintained or increased, and thermal stability and/or mechanical properties of the polyimide film are sharply improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyimide precursor composition, comprising
a polyamic acid comprising a repeating unit represented by Chemical Formula 1 and
transparent metal oxide nanoparticles coordinated to a ligand represented by RCOOH, wherein R is a linear or branched C1-C4 alkyl or a linear or branched C2-C4 alkenyl:

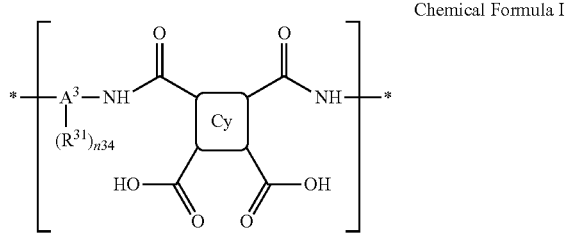

Chemical Formula I wherein in Chemical Formula 1,
Cy is the same or different in each repeating unit, and is each independently a functional group selected from a substituted or unsubstituted C4 to C20 carbocyclic group, a substituted or unsubstituted C6 to C20 monocyclic aromatic group, a substituted or unsubstituted C6 to C20 condensed polycyclic aromatic group, and a substituted or unsubstituted C6 to C20 non-condensed polycyclic aromatic group linked to each other by a single bond or a linker selected from a substituted or unsubstituted alkylene group, a substituted or unsubstituted cycloalkylene group, a substituted or unsubstituted heterocycloalkylene group, a substituted or unsubstituted arylene group, a substituted or unsubstituted heteroarylene group, —SO$_2$—, —C(=O)—, and —O—,
A$^3$ is a substituted or unsubstituted C1 to C20 alkylene group, a substituted or unsubstituted C5 to C40 arylene group, a substituted or unsubstituted C3 to C40 heteroarylene group, a substituted or unsubstituted C5 to C40 cycloalkylene group, or a substituted or unsubstituted C5 to C40 heterocycloalkylene group,
R$^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group,
n34 is an integer ranging from 0 to 10, provided that n34+2 is equal to the bond valency of A$^3$.

2. The polyimide precursor composition of claim 1, wherein the transparent metal oxide nanoparticle is selected from TiO$_2$, HfO$_2$, ZrO$_2$, SiO$_2$, and a combination thereof.

3. The polyimide precursor composition of claim 1, wherein the ligand represented by RCOOH is acetic acid, acrylic acid, or methacrylic acid.

4. The polyimide precursor composition of claim 1, wherein the transparent metal oxide nanoparticles are included in an amount of less than or equal to about 0.5 percent by weight based on the total weight of the polyamic acid and the transparent metal oxide nanoparticle.

5. The polyimide precursor composition of claim 1, wherein the transparent metal oxide nanoparticle is selected from TiO$_2$, HfO$_2$, and a combination thereof.

6. The polyimide precursor composition of claim 1, wherein the ligand represented by RCOOH is acetic acid.

7. The polyimide precursor composition of claim 1, wherein the transparent metal oxide nanoparticle is included in an amount of less than or equal to about 0.4 percent by weight based on the total weight of the polyamic acid and the transparent metal oxide nanoparticle.

8. The polyimide precursor composition of claim 1, wherein the polyamic acid comprising the repeating unit represented by Chemical Formula 1 is a reaction product of an amine compound represented by Chemical Formula 2 and an acid dianhydride represented by Chemical Formula 3:

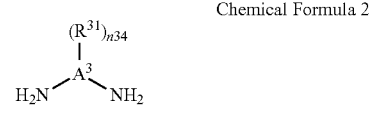

Chemical Formula 2 wherein in Chemical Formula 2,
A$^3$, R$^{31}$, and n34 are the same as in Chemical Formula 1;

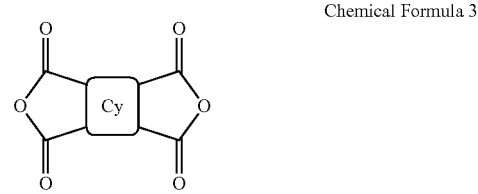

Chemical Formula 3 wherein in Chemical Formula 3,
Cy is the same as in Chemical Formula 1.

9. The polyimide precursor composition of claim 8, wherein the amine compound represented by Chemical Formula 2 is selected from compounds represented by chemical formulae, and a combination thereof:

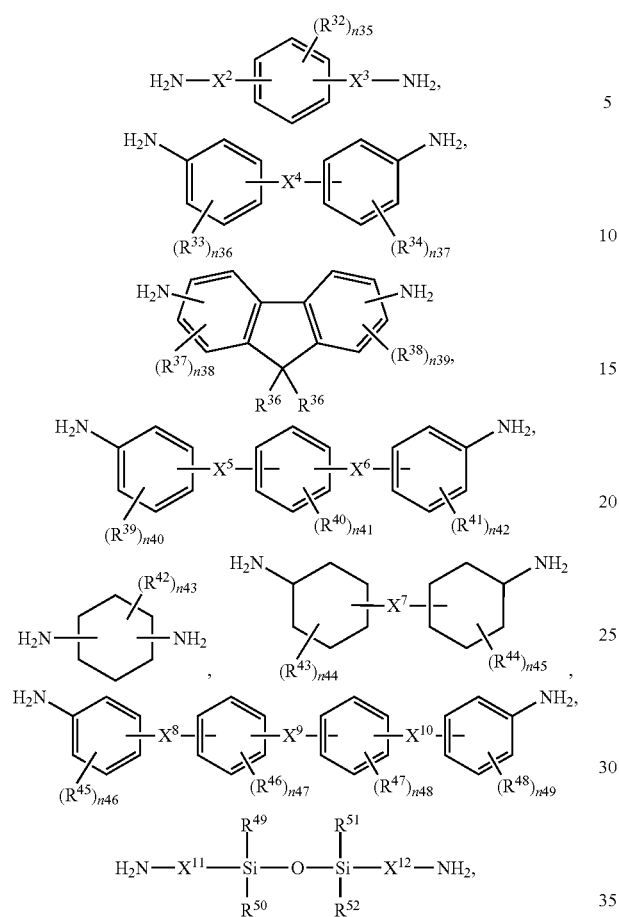

wherein in chemical formulae, $R^{32}$ to $R^{52}$ are the same or different and are each independently a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different and are each independently a single bond, a substituted or unsubstituted C1 to C10 alkylene group, a substituted or unsubstituted C1 to C10 cycloalkylene group, a substituted or unsubstituted C6 to C15 arylene group, —SO$_2$—, —O—, —C(=O)—, or a combination thereof, n35 to n37 and n40 to n49 are each independently integers ranging from 0 to 4, and n38 and n39 are each independently integers ranging from 0 to 3.

10. The polyimide precursor composition of claim 8, wherein the amine compound represented by Chemical Formula 2 is selected from compounds represented by chemical formulae, and a combination thereof:

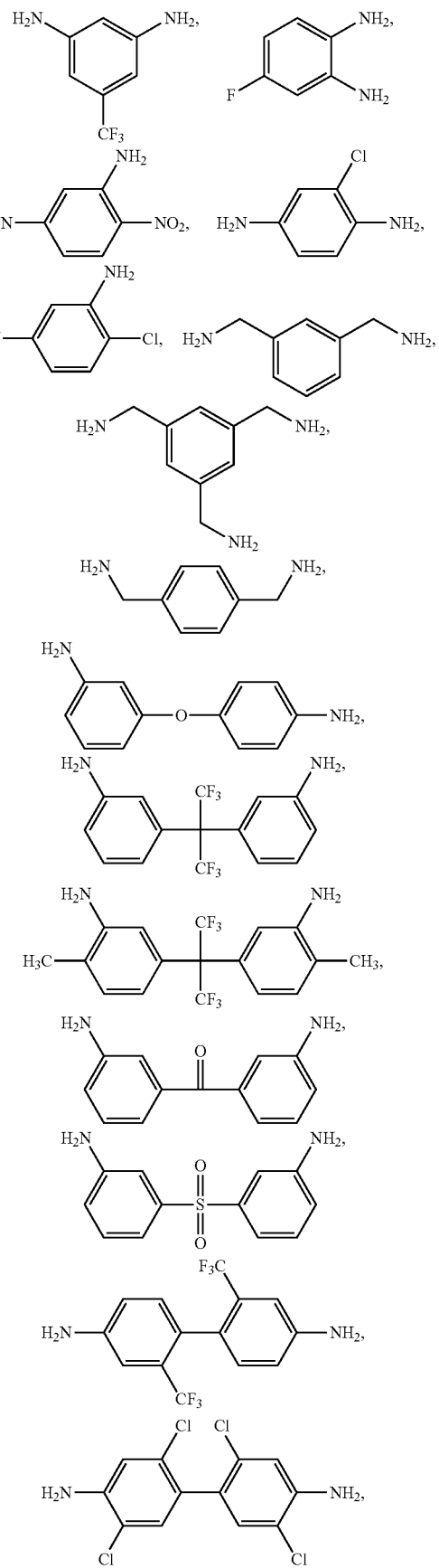

-continued

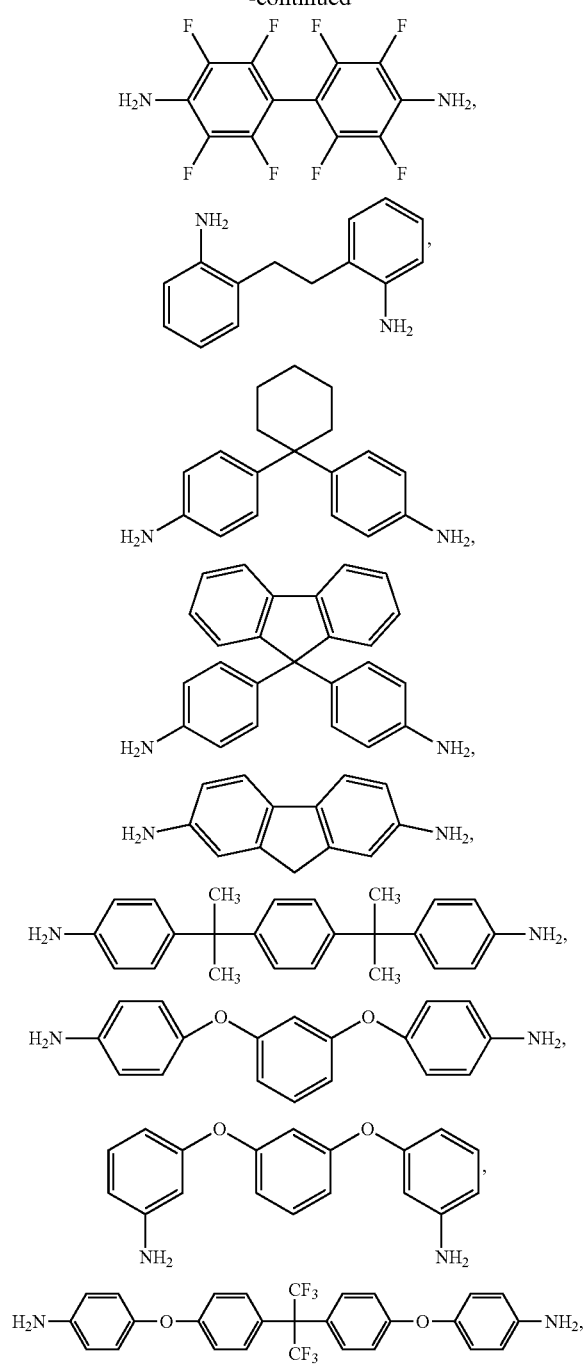

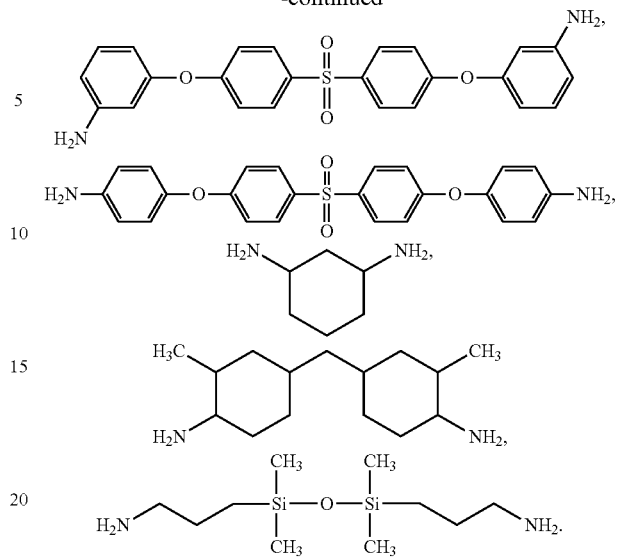

11. The polyimide precursor composition of claim 8, wherein the acid dianhydride compound represented by Chemical Formula 3 is at least one selected from 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

12. A method of preparing a polyimide comprising imidizing the polyimide precursor composition according claim 1.

13. The method of claim 12, wherein the imidizing comprises heat-treating the polyimide precursor composition at a temperature of about 200° C. to about 350° C.

14. A polyimide prepared according to the method of claim 12.

15. A film comprising the polyimide according to claim 14.

16. The film of claim 15, wherein the film is a transparent polymer substrate.

17. The film of claim 15, wherein the film has light transmittance of greater than or equal to about 85% for light of a visible ray region.

18. The film of claim 15, wherein the film has haze of less than or equal to about 1.2.

19. The film of claim 15, wherein the film has yellow index of less than or equal to about 17.

20. The film of claim 15, wherein the toughness of the film is about 2 to 4 times greater than the toughness of a polyimide film comprising no metal oxide nanoparticles.

* * * * *